(12) United States Patent
Williams

(10) Patent No.: US 6,256,753 B1
(45) Date of Patent: Jul. 3, 2001

(54) BUS ERROR HANDLING IN A COMPUTER SYSTEM

(75) Inventor: Emrys J. Williams, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/106,882

(22) Filed: Jun. 30, 1998

(51) Int. Cl.$^7$ .................................................. G06F 11/00
(52) U.S. Cl. ................................................. 714/47; 714/43
(58) Field of Search ..................... 714/47, 2, 5, 8, 714/11, 13, 25, 31, 43, 44, 45, 48, 52, 10, 30, 39; 395/500.05, 500.46

(56) References Cited

U.S. PATENT DOCUMENTS

| | | | |
|---|---|---|---|
| 4,628,511 | * 12/1986 | Stitzlein et al. | 371/22 |
| 4,785,453 | * 11/1988 | Chandran et al. | 371/68 |
| 4,965,717 | * 10/1990 | Cutts, Jr. et al. | 364/200 |
| 5,068,851 | * 11/1991 | Bruckert et al. | 371/16.1 |
| 5,146,461 | * 9/1992 | Duschatko et al. | 371/40.1 |
| 5,235,602 | * 8/1993 | Klim | 371/49.1 |
| 5,365,526 | * 11/1994 | Wu | 371/16.5 |
| 5,491,816 | * 2/1996 | Matoba et al. | 395/181 |
| 5,687,310 | * 11/1997 | Rotker et al. | 395/182.09 |
| 5,758,190 | * 5/1998 | Johnson et al. | 395/868 |
| 5,764,660 | * 6/1998 | Mohat | 371/68.1 |
| 5,826,003 | * 10/1998 | Matoba et al. | 395/182.05 |
| 6,012,148 | * 1/2000 | Laberge et al. | 714/2 |

* cited by examiner

*Primary Examiner*—Nadeem Iqbal
(74) *Attorney, Agent, or Firm*—Conley, Rose & Tayon, PC; B. Noël Kivlin

(57) ABSTRACT

An I/O monitor includes an interface mechanism for connection between a processor and an I/O bus and an error signal modifier. The error signal modifier responds to an error signal from the I/O bus by substituting a determined response for passing to the processor. By returning a determined response to the processor, as opposed to the bus error signal, the need for bus error exception processing by the processor software is removed. The monitor determines a resource forming the source of the bus error and labels the resource as defective in a status register for the resource in the monitor. The monitor generates an interrupt when a resource is first labelled as defective. Subsequently, further access to the resource by the processor are handled by the monitor. The monitor responds to an I/O read operation to a resource labelled as defective to prevent the I/O read operation from being passed to the bus and to return a determined data response. It responds to an I/O write operation to a resource labelled as defective to discard the I/O write operation and to terminate with an acknowledgement as the determined response.

30 Claims, 9 Drawing Sheets

BUS ERROR HANDLING IN A COMPUTER SYSTEM

BACKGROUND OF THE INVENTION

This invention relates to computer systems with a processor which communicates with I/O devices via an I/O bus, and to a monitor unit and method for such systems.

In such a system, bus cycles to I/O devices usually end with successful data transfer. If something goes wrong, the I/O cycles can end with a data exception. Data exception handling is a well known and accepted technique in computer system design. However, there are times when it is inconvenient or impossible to handle such a data exception in the software being executed in the processor.

An aim of the invention is to seek to avoid the need for data exception handling by the processor software.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided an I/O monitor for a computer system. The monitor comprises an interface mechanism for connection between a processor and an I/O bus and an error signal modifier configured to be operable to respond to an error signal from the I/O bus to substitute a determined response for passing to the processor.

By returning a determined response to the processor, as opposed to the bus error signal, the need for bus error exception processing by the processor software is removed. The determined response can be processed as appropriate without the need for exception processing.

Preferably, the monitor is operable to determine a resource forming the source of the bus error and to label the resource as defective. This can be achieved by maintaining a status register for the resource in the monitor.

The monitor can be operable to generate an interrupt when a resource is first labelled as defective.

Subsequently, further access to the resource by the processor will be handled by the monitor. The monitor can be arranged to respond to an I/O read operation to a resource labelled as defective to prevent the I/O read operation from being passed to the bus and to return a determined data response. It can be arranged to respond to an I/O write operation to a resource labelled as defective to discard the I/O write operation and to terminate with an acknowledgement as the determined response.

In accordance with another aspect of the invention, there is provided an I/O monitor for a computer system which includes an interface for connection between a processor and an I/O bus a mechanism for labelling a fault status of a resource connected to the I/O bus and an error signal mechanism for responding to an I/O operation from a processor addressed to a resource labelled as defective to provide a determined response to the processor. The determined response can be a determined data response for an I/O read operation and an acknowledgement for an I/O write operation.

In accordance with a further aspect of the invention, there is provided a computer system comprising at least one processing set and a monitor as described above.

The system can include a plurality of processing sets. The systems could be synchronously operating. Alternatively, at least one of the plurality of processing sets could be operable asynchronously of another one. The processing sets could each comprises a single processor, or multiple processors. For example, a processing set may be formed by a symmetric multiprocessor. The resource can be an I/O device.

The system can be a fault tolerant computer system. The monitor can include a voter determining equivalent operating of the processing sets by comparing I/O operations from the processing sets with the voter being located between the plurality of processing sets and the error signal modifier.

In accordance with yet a further aspect of the invention there is provided a method of reporting bus errors in a computer system comprising a processor and an I/O bus and a monitor between the I/O bus and the processor The method comprises steps of:

the monitor converting an error signal from an I/O bus into a determined response; and the monitor passing the determined response to the processor.

In another aspect, the invention provided a method for handling I/O operations in a computer system comprising at least one processor, an I/O bus and a monitor located between the at least one processor and the I/O bus. The method comprises steps of:

the monitor maintaining a fault status for resources connected to the I/O bus; and the monitor responding to an I/O operation from the processor addressed to a resource labelled as defective to provide a determined response to the processor.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
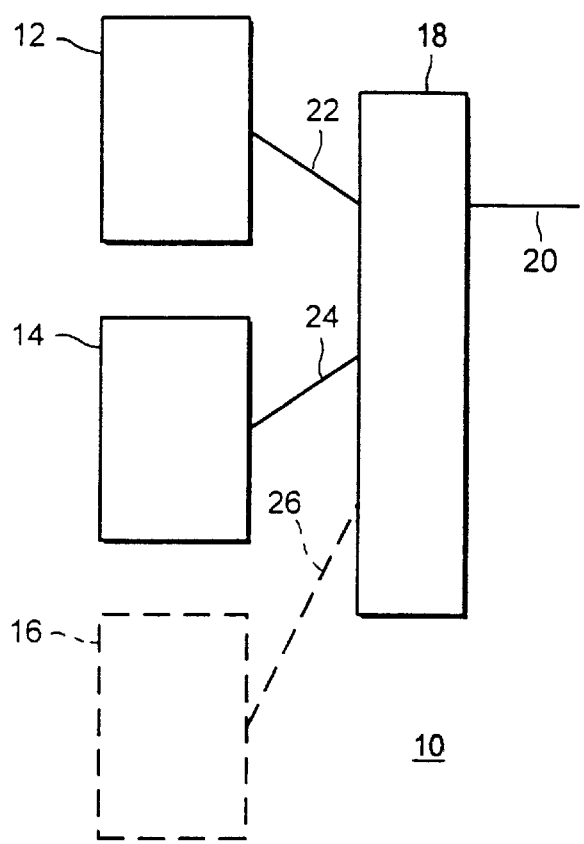
FIG. 1 is a schematic block representation of a multiprocessor computer system.

FIG. 1 is a schematic overview of a multiprocessor computer system 10 comprising a plurality of processing sets 12, 14, 16 and an input/output (I/O) monitor unit 18. The multiprocessor computer system 10 can comprise only two processing sets 12, 14, or may comprise further processing sets such as the third processing set 16 shown in dashed lines, or even further processing sets. Each of the processing sets could be formed by a single, individual, processor, or may comprise a group of processors (for example a symmetric multiprocessor (SMP) system) and would normally be provided with local memory. Such a processing set is also known in the art as a CPUset. The processing sets are arranged to operate under the same or equivalent programs. The I/O monitor unit 18 links individual processing set I/O buses 22, 24, 26, etc. from the processing sets 12, 14, 16 to a common I/O device bus 20 to which I/O devices are connected. The monitor unit 18 thus forms a bridge between the processing set I/O buses 22, 24 26, etc. and the I/O device bus 20. Although one monitor unit and one I/O device bus 20 is shown, a plurality of monitor units such as the monitor unit 18, each with a respective I/O device bus 20, may be provided.

The I/O monitor unit (monitor) 18 is arranged to detect a difference in operation between the individual processor units 12, 14, 16 to determine faulty operation of one or more of those processing sets 12, 14, 16.

If more than two processing sets are provided, the monitor unit can detect a difference in operation between the processing sets and can employ majority voting to identify a faulty processing set, which can be ignored. If just two processing sets are used, or if following elimination of one or more faulty processing sets only two valid processing sets remain operable, a difference between the operation of the processing sets can signal faulty operation of one of the processing sets, although identification of which one of the processing sets is faulty can be a more complex task than simply employing majority voting.

The structure shown in FIG. 1 could be that for a synchronously operating multiprocessor system. In this case, because the individual processing sets 12, 14, 16 are operating synchronously, they should provide the same I/O outputs at the same time, and therefore it is an easy matter for the monitor unit 18 to compare those outputs to determine whether the processors are still in synchronism.

The structure shown in FIG. 1 also applies to a system where the processing sets 12, 14, 16 are not, or are not all, synchronously operating. In this case, the difficulty arises in determining what I/O outputs need to be compared and when these need to be compared by the monitor unit 18 in order to determine equivalent operating (i.e. equivalent operation or functioning) of the processing sets 12, 14, 16.

In simple terms, in the case of an asynchronous system, the monitor unit 18 observes the I/O outputs from the processing sets 12, 14, 16 and also presents I/O inputs to the processing sets 12, 14, 16. The monitor unit 18 acts to synchronize the operation of the processing sets 12, 14, 16 as described in more detail below. If one processing set (e.g. 12) presents an I/O output and another processing set (e.g. 14) does not, the monitor unit 18 waits to see if the output of die other processing set 14 eventually arrives. It can be arranged to wait up to a time limit, the worst case difference in the operating time between the compared processing sets. If no output has arrived, or a different output has arrived, the monitor unit 18 can be arranged to flag the event as a mis-compare. This approach can be used to build a fault tolerant computer by having all I/O operations from the processing sets 12, 14, 16 pass through the monitor unit 18. The monitor unit 18 can delay passing on an I/O operation until it is sure that at least a certain number or proportion of the processing sets, typically a majority of the processing sets, concur. If the monitor unit knows that the I/O operation will not change the state of the I/O system—a read without side effects, for example—it can pass the I/O operation as soon as the first I/O operation output from the fastest compared processing set arrives, to enhance operating speed. Even if, in a fault tolerant processing environment, the system eventually decides that the cycle was a mistake, it will have done no harm, and the optimization could speed things up.

Figure 2:
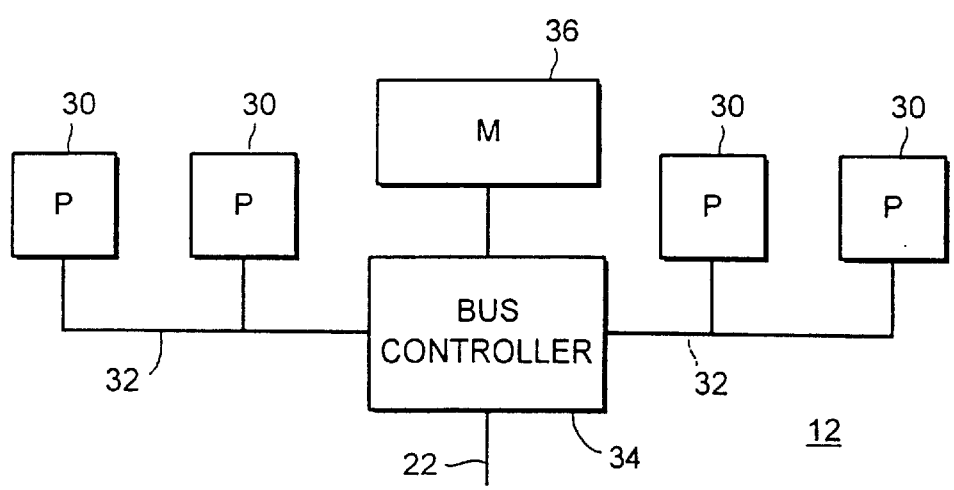
FIG. 2 is a schematic representation of one processing set for the system of FIG. 1.

FIG. 2 is a schematic overview of one possible configuration of a processing set, such as the processing set 12 of FIG. 1. The processing set 14 can have the same configuration. In FIG. 2, one or more processors (here four processors) 30 are connected by one or more internal buses 32 to a processing set bus controller 34. The processing set bus controller 34 is connected via a processing set I/O bus 22 to a monitor unit (not shown in FIG. 2). Although only one processing set I/O bus 22 is shown in FIG. 2, in other examples there may be multiple monitor units, in which case there would be one processing set I/O bus 22 per monitor unit from the processing set bus controller 34. In the processing set 12 shown in FIG. 2, individual processors operate using common memory 36, and receive inputs and provide outputs on the common processing set I/O bus(es) 22 via the processing set bus controller 34. It will be appreciated that FIG. 2 is a schematic representation of one example only of a possible configuration for a processing set and that other configurations are possible in other examples depending upon the processing and other requirements of the processing set concerned. For example, a processing set may include only a single processor, with or without memory and with an I/O bus controller.

Figure 3:
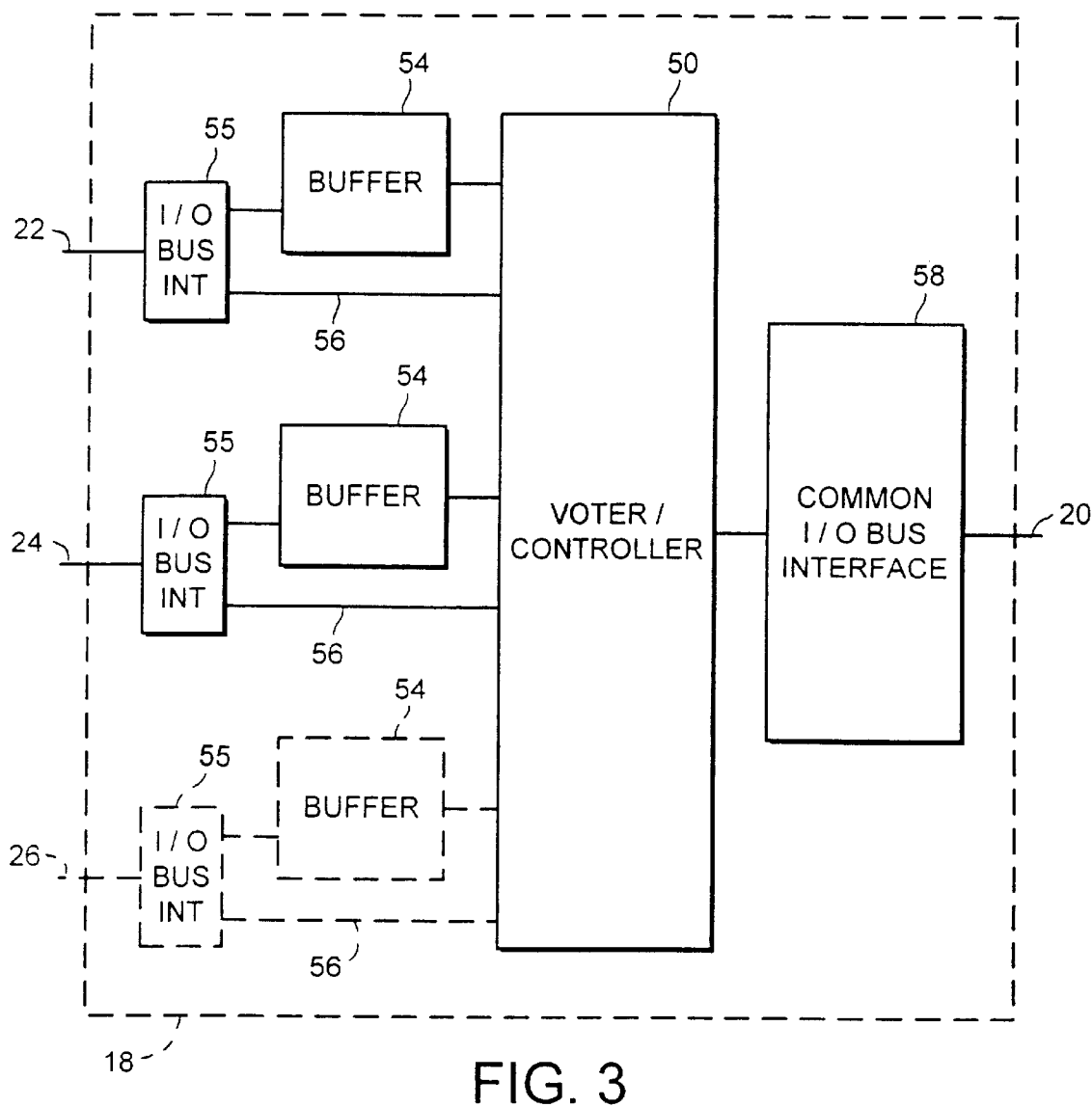
FIG. 3 is a schematic block diagram of a monitor unit of the system of FIG. 1.

FIG. 3 is a schematic overview of an example of a monitor unit 18. As shown in FIG. 3, the monitor unit 18 includes a voter/controller 50. Respective I/O bus interfaces 52 are provided for each of the I/O buses 22, 24, 26 to the processing sets 12, 14, 16 depending on the number of processing sets provided in the system. Respective buffers 54 are provided for buffering I/O operations received from the buses 22, 24, 26. Buffer stages 55 each comprise a bus interface 52 and a corresponding buffer 54.

Return lines 56 provide for signals to be passed between the voter 50 and the respective bus interfaces 52. The voter/controller is responsive to the I/O operations received from the buses 22, 24, 26 in order to control the passing of I/O operations via the common I/O device bus interface 58 to the common I/O device bus 20. The voter/controller is also operable selectively to control a degree of synchronization of the asynchronously operating processing sets 12, 14, 16.

This 'degree of synchronization' is based on selectively stalling the processor(s) 30 of the processing sets 12, 14, etc. without the need for a synchronous clock. This is achieved by arranging for each processor to provide a progress indication so that the monitor can tell how far processing has proceeded. In the distant past, processors were arranged to output a pulse on the completion of each instruction. However, this is no longer appropriate. Nowadays, instructions are completed faster than can be signaled externally. Also, the out-of-order nature of execution makes it difficult to decide exactly when an instruction has completed. Is it when the instruction itself is finished, or when the instruction and all earlier instructions are finished? These complications need a more sophisticated progress indication.

The progress indication is used by the monitor to slow down a processor so that it does not become too far out of step with another. For this, processors also need to provide some way to allow the monitor to stall them.

Figure 4:
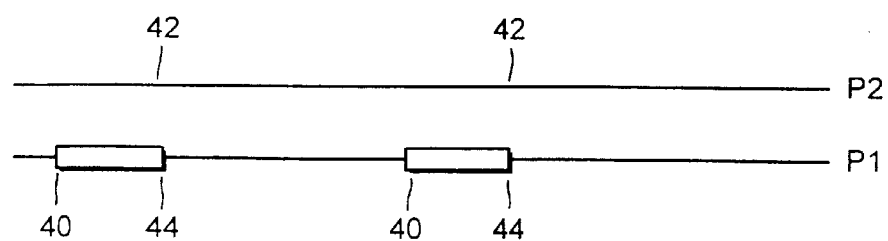
FIG. 4 illustrates the stalling of a processor to allow another to catch up.

FIG. 4 is a timing diagram illustrating the stalling of one processor to allow another to catch up. In FIG. 4, time increases from left to right. A first, faster, processor P1 issues a progress indication at 40 and is permitted to continue to processing unless it receives a stall indication from an external monitor. In response to the return of a stall indication from the monitor to the first processor P1, this processor then stalls (as represented by a block symbol) until the progress indication is supplied at 42 by the second, slower, processor P2. The first processor is then permitted to proceed at 44 on receipt of a release from the monitor.

Progress indications should be generated such that the time intervals between them are approximately constant, such that they do not come so fast that as to make electrical signaling impractical, and such that progress indication is deterministically related to the instructions executed. For stall requests, it is desirable that the external electronics does not have to be exceptionally fast either to request or to refrain from requesting a stall. When the external electronics does not request a stall, the processor should not be slowed in any way. However, when the stall is requested, the processor should halt in a precise state, with all instructions up to the stalled instruction retired, and no instructions beyond it issued.

One example of a mechanism for providing a suitable progress indication is to assert an output every N instructions, where N is some fixed (or even programmable) number of instructions. This can be achieved by providing an instruction counter which outputs a progress indication every N instructions. This works well when all the instructions take approximately the same time to execute. If the instructions vary in execution time, or some instructions may be extended by external communications (like an I/O read operation), this simple mechanism may provide time intervals between progress indications that are too variable for convenience.

A more sophisticated mechanism for providing a progress indication enables the instruction count to vary according to the real state. This could take into account the variation in instruction timing to provide more-or-less constant intervals between progress indications.

Where reference is made to the 'real state' this is to be understood to encompass the programmer visible state, subject to certain constraints. Thus it includes the content of a fixed set of registers, including the program counter and main memory, but excludes transitory elements such as caches and intermediate pipeline values. The 'real state' includes all data required for context switching between processes plus, for example, operating system status data.

Figure 5:
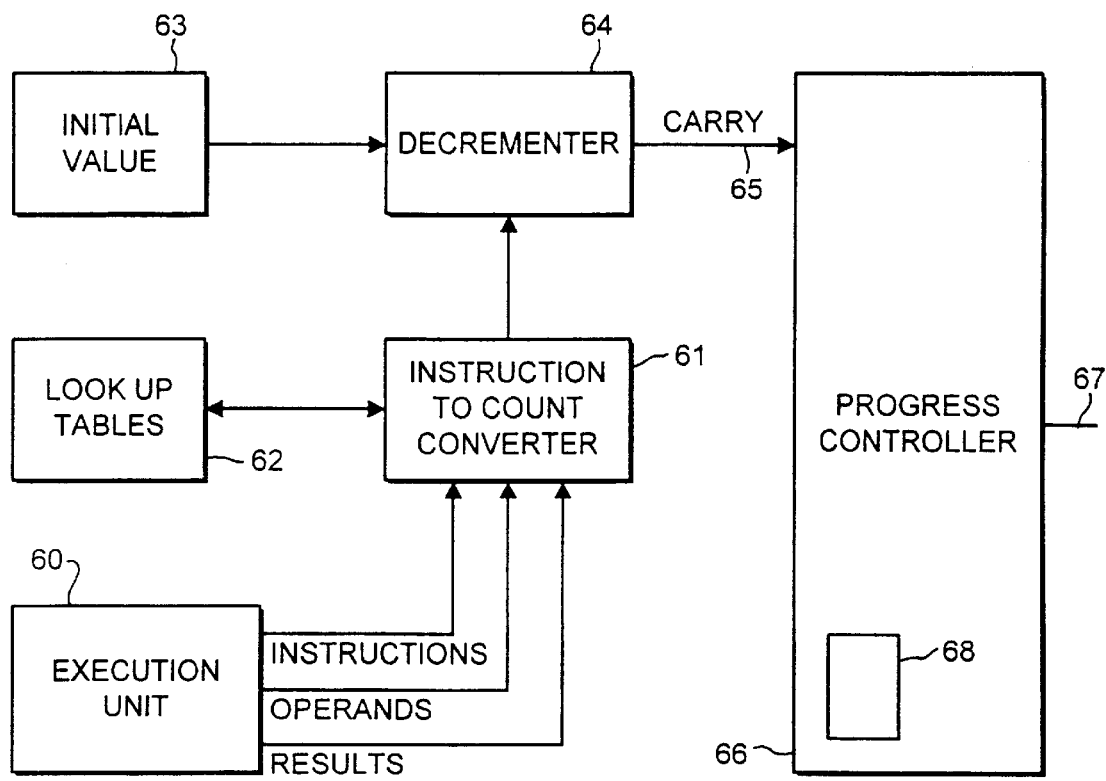
FIG. 5 is a schematic block diagram of an aspect of a processor of FIG. 1.

FIG. 5 illustrates an example of a mechanism for achieving this. In FIG. 5, an instruction-to-count converter 61 translates each instruction as it is executed by the execution unit 60 into an approximate time equivalent. This represents a best estimate of how long the instruction is going to take to execute. To do this, the converter 61 takes into account one or more parameters of the instruction, such as the instruction type, the operands being handled, and the results produced, including addresses used, and may also take account of previous instructions. One or more look-up tables 62, which may be programmable, can provide conversion factors between the parameters and timing information for input to the converter 61. To provide determinism, the converter 61 does not take into account data not included in the real state of the processor, such as the congestion in pipelines or whether a variable is in a cache or not. The approximate time equivalent, a number, is fed to the decrementer 64, where it forms a decrement value to be subtracted from the current value stored in the decrementer 64. When the decrementer 64 underflows through zero, it produces a carry output 65 which is received by a progress controller 66. The progress controller 66 can then output a signal externally as the progress indicator 67. Before the next decrement operation, the decrementer is reinitialized to an initial value from a register 63, which may be programmable.

The instruction-to-count converter 61 may include stored state information. One application of this is accounting for software emulation of particular instructions. When the converter 61 detects (e.g., from the instruction type information) that an instruction is to be emulated instead of executed, it sets an internal flag to show that it should no longer count instructions, equivalent to producing decrement values of zero. When the converter 61 sees the return-from-emulation instruction at the end of the emulation routine, it produces the decrement value for the emulated instruction, which it could compute internally or which could be provided by special code in the emulation routine. In this way, a processor which emulates some instructions could be made equivalent to one which executes them all in hardware, for comparison purposes.

The carry output 65 can be used by the progress controller 66 to provide a progress indication 67 output from the processor as a pulse or a step on a signal wire. Alternatively, the carry output can lead to the progress controller 66 issuing a special progress indication I/O cycle to be scheduled oil the processor I/O bus. For example, the processor can issue a special read cycle on the I/O bus at each progress indication. This is illustrated schematically in FIG. 6.

Figure 6:
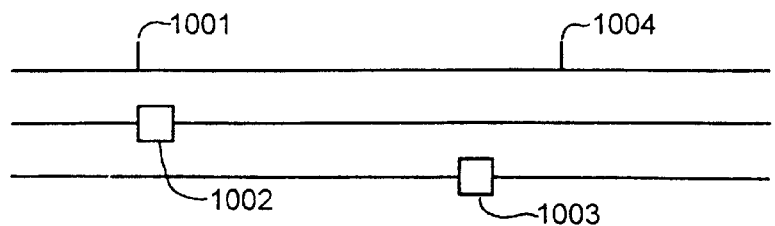
FIG. 6 illustrates special I/O cycles for progress indication.

Before moving to FIG. 6, it is to be noted that a block 68 is shown in FIG. 5. This represents a sent/acknowledgment indicator 68 (see FIG. 5), the purpose and operation of which will be described later.

FIG. 6 is a timing diagram in which time increases from left to right. FIG. 6 represents an internal progress indication 1001, which results in the processor issuing special progress indication I/O request 1002. At some later time, the monitor 18 responds with 1003. Later, the processor generates another internal progress indication 1004, which will trigger another cycle externally. Using this system, it is possible to stall the processor automatically. If the processor is designed so that it cannot issue progress indication 1004 before it has received response 1003, the monitor 18 can have the effect of stalling a processor by merely delaying delivery of 1003. Provided 1003 arrives adequately before 1004, the processor will execute at full speed. Delaying 1003 can postpone 1004 indefinitely. Accordingly, with the arrangement represented in FIG. 6, the progress of two processors of different speed can be kept in step.

Figure 7:
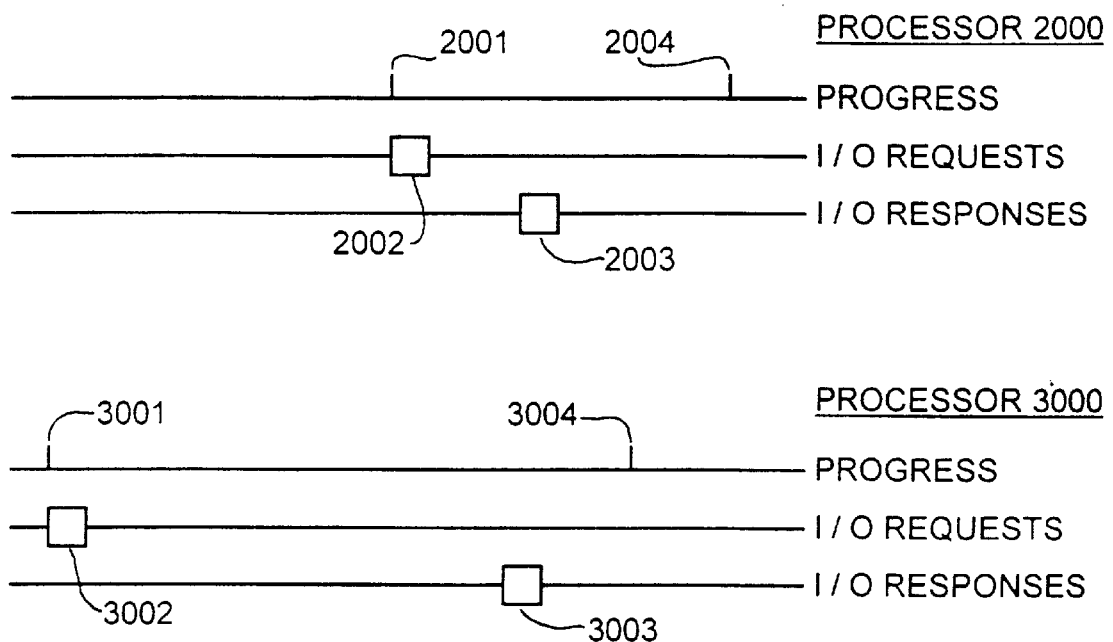
FIG. 7 illustrates the keeping of processors in step.

FIG. 7 is also a timing diagram in which time increases from left to right. As shown, following an internal progress indication 3001, a faster processor 3000 issues special progress indicator I/O cycle request 3002. This is before a slower processor 2000 issues its equivalent request 2002, following an internal progress indication 2001. The monitor 18 refrains from issuing responses 2003 and 3003 until it has observed both requests 2002 and 3002. This inhibits processor 3000 from progressing to the state where it can issue internal progress indication 3004, so keeping the processors in step.

Along with the responses 2003 and 3003, the monitor can send interrupt information. This could be as simple as a one-bit interrupt request or could be a whole packet of interrupt data. The processor can use this to determine whether it is going to take an interrupt or continue normal processing. If the processor is designed to take interrupts only at the precise instruction associated with an internal progress indication, then any requested interrupt will be taken by processor 2000 at progress indication 2004, and by processor 3000 at 3004. For lockstep processors, this would be at the precise same instruction on processors 2000 and 3000. The monitor acts to keep the progress indications in step, and can be sure that both processors take the interrupt on the same progress indication without ambiguity. The processors themselves ensure deterministic delivery of progress indication, affected only by their real state.

Interrupts delivered in this way can be delayed by about two progress indications before the processor begins to execute the interrupt routine. It is desirable to arrange that this delay does not produce an unacceptable performance.

When processor 2000 is nearing progress indicator 2004, it may well want to begin issuing instructions beyond that precise instruction implied by 2004. Instructions execute out-of-order for speed. In order to provide a precise interrupt model at this precise instruction, this may not be allowed. This would slow the processor. In order to avoid this, the processor could be designed to ignore this restriction when response 2003 has already been received and the processor already knows that no interrupt will be taken at 2004. So, if 2003 occurs early enough before 2004, the processor will continue at top speed. This provides a mechanism for delivering interrupts precisely at deterministic instructions independent of the operating speed of the processor and without slowing the processor unnecessarily, which is precisely what is needed in an asynchronous lockstep system.

Instead of performing a special progress indication I/O cycle on the I/O bus, different signaling means can be used for fundamentally the same -protocol. Wires separate from the I/O bus can carry the processor special cycle request to the monitor and carry the response back. This allows the progress indication interval to be short without consuming I/O bus bandwidth. If wanted, the processor can perform a special I/O cycle after delivery of an interrupt request to fetch a packet of interrupt data.

In fault tolerant systems, the monitor is arranged to deal with the possible problem of a missing progress indication. An upper bound is set for the time between progress indications. The upper bound chosen in any particular implementation can be based on processor speed variations and could be defined as a multiple of the normal speed of the processors. The upper bound is typically defined as a function of the normal time between progress indications. Accordingly, if the progress indications are 1 us apart, the upper bound might be 2 us. If the progress indications are 100 ms apart, the upper bound might be 200 ms. This would mean that a monitor would have to wait at least 200 ms instead of 2 us before beginning recovery action if no progress indication arrived. This illustrates that it is desirable to have short and well-defined intervals between progress indications.

Figure 8:
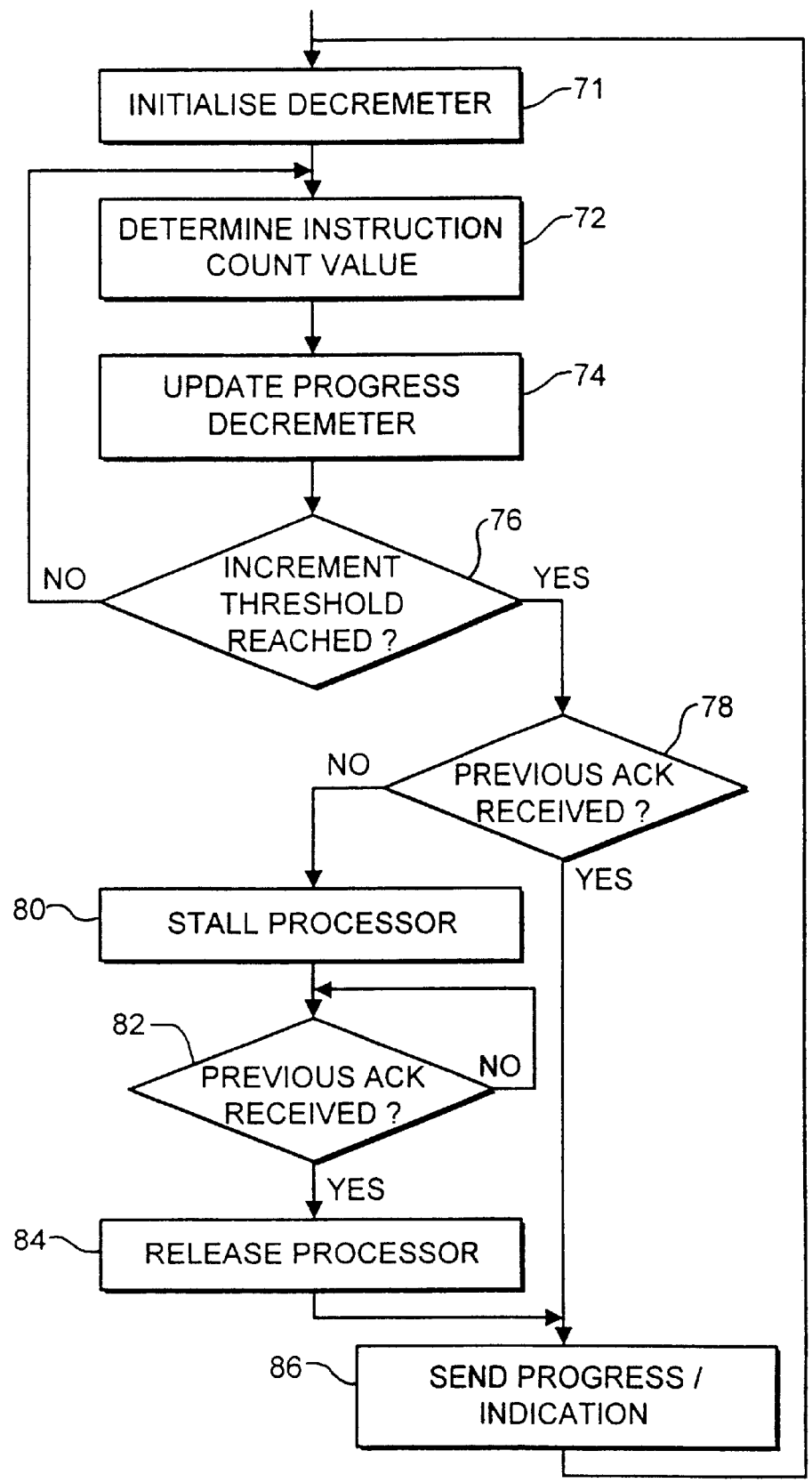
FIG. 8 is a flow diagram illustrating operation of the system of FIG. 1.

FIG. 8 is a flow diagram illustrating the operation and inter-relationship of the various elements shown in FIG. 5 in order to enable selective synchronization of the individual processing set as described with reference to FIGS. 6 and 7.

Accordingly, when an instruction is dispatched, the decrementer 64 can be updated at step 74, following determination of an instruction count value by the converter 61 at step 72. Although a decrementer 64 is shown in FIG. 5, in another implementation a positive changing counter, for example a modulo-n counter, could be used instead.

If, in step 76, the decrementer 64 has not underflowed, then control passes back to step 72 for the next instruction. However, if the decrementer has underflowed, a test is made in step 78 to determine whether an acknowledgment for a previous progress indication has been received. If an acknowledgment for a previous progress indication has been received, a progress indication is sent to the monitor unit at step 86, and a sent/acknowledgment indicator 68 (see FIG. 5) is set in the progress controller 66 to indicate that a progress indication has been sent, but no acknowledgment has been received. Control then passes back to step 71 to initialise the decrementer 64.

If, in step 78, it is determined that the set/acknowledgment indicator 68 is still set, indicating that a progress indication has been sent, but no acknowledgment thereto has been received, the processor is stalled in step 80. The processor remains stalled until it is determined in step 82 that the sent/acknowledgment indicator 68 has been re-set, indicative of receipt of the acknowledgment for the progress indication previously sent. At this time, the processor is released in step 84. Control then passes to step 86 where the next progress indication is sent and the sent/acknowledgment indicator 68 is once more set. Control then passes back to step 72 for the next instruction.

Accordingly, it can be seen that, according to FIG. 8, the processor is stalled if an acknowledgment for a previous progress indication has not been received at the time the processor determines that a further progress indication should be sent to the monitor unit 18.

As mentioned above, the I/O progress indications can be sent to the monitor unit 18 as specific I/O operations. Alternatively, they could be supplied over a special hard-wired connection (not shown).

Figure 9:
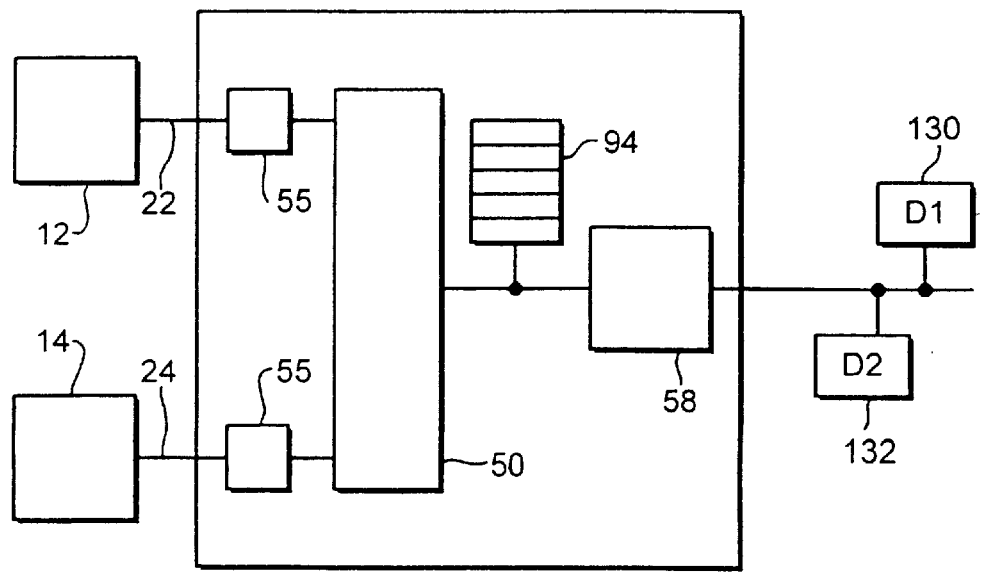
FIG. 9 is a schematic block diagram illustrating an aspect of the monitor unit of FIG. 1.

FIG. 9 is a schematic diagram of aspects of the monitor unit responsive to the specific progress indication I/O operations from the individual processing sets to establish concurrent operation of those processing sets, and to return acknowledgement to the individual processing set when concurrent operation has been determined, as described with reference to FIG. 7. Elements already described before as indicated by like reference signs will not be described again here.

As shown in FIG. 9, a progress register 94 is provided for each corresponding processor of the processing sets connected to the monitor unit 18. Thus, for example, if there are three processors P0, P1 and P2 in each of two processing sets PSA and PSB, then there will be three progress registers R0, R1 and R2 for the processors P0, P1 and P2, respectively. To provide synchronization, each processor in the processing sets is operable to issue a special I/O read operation to the respective progress registers. Thus, in the example above, the P0 processor in each of processing sets PSA and PSB issues special I/O read operations to progress register R0, the P1 processor in each of processing sets PSA and PSB issues special I/O read operations to progress register R1 and the P2 processor in each of processing sets PSA and PSB issues special I/O read operations to progress register R2. I/O synchronization within the monitor is arranged to delay the return of a response to the read processors (i.e. by returning the read data from progress register 94 concerned) as an acknowledgement to the processors until an equivalent read has been performed by each of equivalent processors of the processing sets. This response is what is then used to control the stalling of the processors as has been described with reference to FIG. 6 to 8 above.

It will be seen that the combination of the logic in the processing sets 12, 14, etc. described with reference to FIG. 5 for reading the progress registers 94 of FIG. 9 in the monitor unit 18 enables the processing of the individual processing sets to be made deterministic and synchronized in accordance with specific points during the processing. As indicated, this avoids the need for a timer, which would not be deterministic in the individual processing set, by the provision of a specific I/O operation or other progress indication signals at predetermined points in the processing determined by counting the individual instructions executed in the processing sets. As indicated, it is preferred that the count is made dependent on the nature of the individual instructions.

While the processing sets 12, 14, etc. may not be strictly deterministic, they should respect some constraints on their operation. It should be possible to perceive an order in the instructions the processors execute. Normally, this is the order in which the instructions are written in the program, modified by branch operations. Processors may internally reorder the instructions, and may execute some instructions in parallel, but the eventual effect should be the same as if the instructions were executed in the order the programmer expects. If this is not the case, the program result may not be as the programmer expects. (In this regard, interrupts and DMA will be discussed below). In addition, the order of I/O operations presented as outputs to the monitor unit 18 are determined absolutely by the program, independent of the detailed timing of execution. This is typically the case, as it is difficult to manage I/O devices without this capability. It should be noted, however, that processors routinely reorder writes behind reads for speed. It is possible to provide for this and still carry out effective I/O operations. This can be managed with separate read and write comparison channels in the monitor unit, providing the processor is guaranteed not to reorder writes among themselves or reads among themselves, and will deliver at least the first read and the first write to the monitor unit at once.

Figure 10:
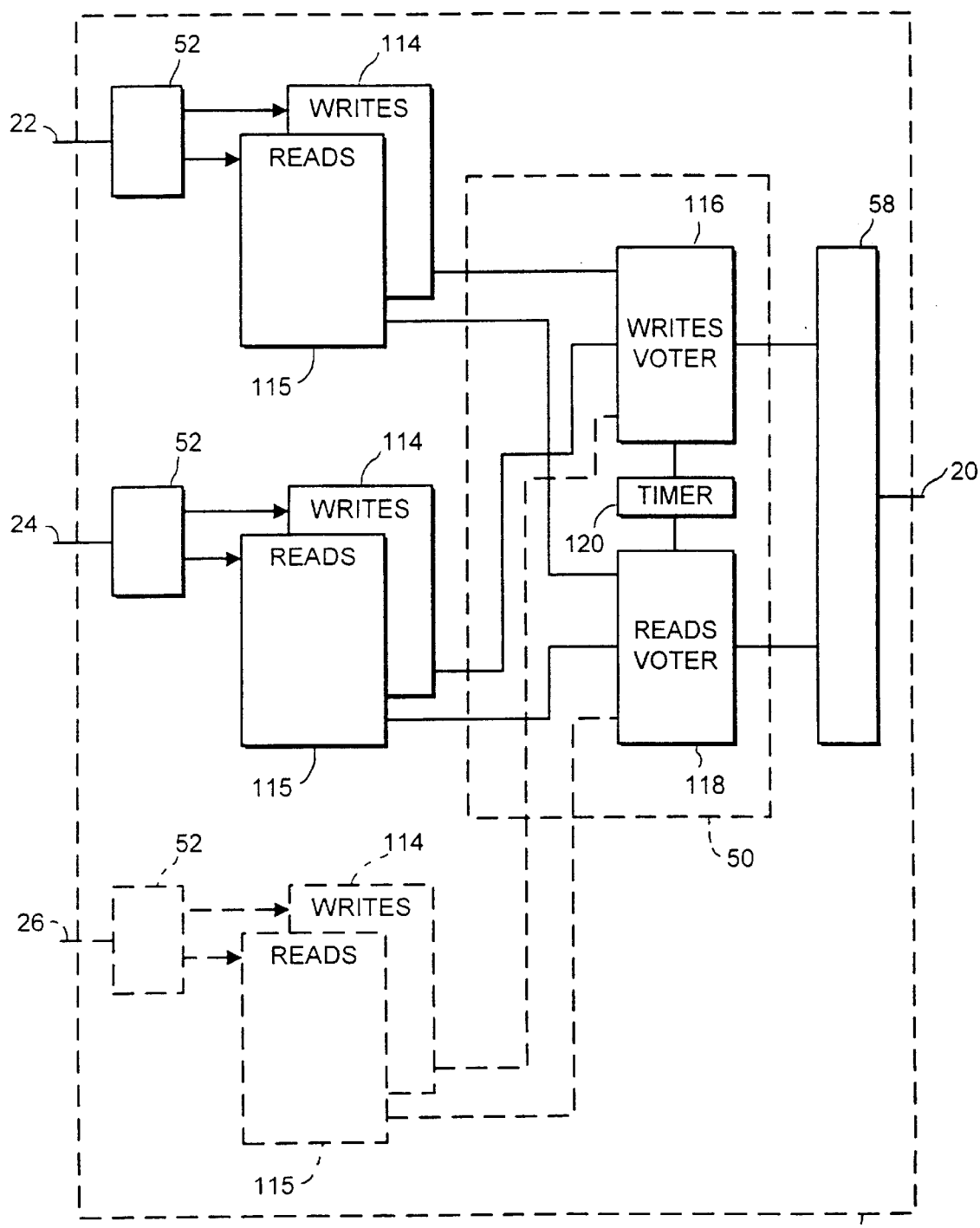
FIG. 10 is a schematic block diagram illustrating a further aspect of the monitor unit of FIG. 1.

FIG. 10 is a schematic representation showing aspects of the monitor unit 18 for controlling the passing of I/O operations to the common external bus or buses 20 and also for determining faulty operation of the individual processor units.

The I/O bus interfaces 52 connected to the respective I/O buses 22, 24 of the processing sets 12, 14 are operable to identify write and read operations and respectively to buffer the write and read operations in respective buffers 114/115. These buffers 114/115 represent one example of a configuration of the buffers 54 of FIG. 3. It should be noted that this is one exemplary arrangement and that other arrangements may not separate writes and reads as indicated in FIG. 10, or may separate I/O operation according to different criteria. An I/O writes voter 116 is operable to compare individual write operations within the respective buffers 114 for the individual I/O processing sets 12, 14, etc. to determine receipt of equivalent I/O write operations. The monitor unit is operable to buffer the write operations for up to a predetermined time as determined by a timer 120 and is operable to identify a fault in respect of one of the processors when corresponding I/O operations are not received from each of the processors. Similarly, a reads voter 118 is provided for comparing buffered read operations and operates in a similar manner.

In a triple modular redundant (TMR) arrangement with three processing sets, the determination of which of the processing sets is faulty can be accomplished by majority voting in the writes and reads voters 116 and 118, respectively. Alternatively, in an arrangement where there are only two processing sets (i.e. a dual modular redundant arrangement (DMR)), the determination of which of the processing sets is faulty can be more complex, but can still be determined by diagnostic techniques.

The writes and reads voters 116 and 118 can be arranged to pass write and read operations via the common I/O bus interface 58 to the common I/O bus or buses 20 in accordance with appropriate strategies. For example, as indicated above, if an I/O operation will not change the state of the I/O system (a read without side effects, for example) the monitor unit can be arranged to pass the I/O operation as soon as the first I/O operation output from a processing set arrives. In other circumstances, where an I/O operation will change the state of the I/O system (a write operation or a read operation with side effects, for example), the monitor unit can be arranged to pass that I/O operation only when a majority (which might be just one in the case where only one remaining processing set is operable), or possibly a plurality, of the processing sets have output the I/O operation. In other words, a state modifying I/O operation is issued to the I/O bus when the monitor unit determines equivalent operation of the processing sets.

It will be appreciated that an initially TMR system could become a DMR system where one of the processing sets is determined to be faulty. Accordingly, equivalent operation of the processing sets can be determined in accordance with a policy which varies according to the number of valid processing sets currently being monitored.

There should be no component of the processing sets which affects eventual operation in a non-deterministic way. For example, a timer in each processing set visible to program operation would not necessarily present the same value at the same step in each program, and is not allowed. On the other hand, the provision of a register which counts the number of instructions executed, as described above, is deterministic. If the 'real state' of a processing set is the total state of all the data which may affect program execution, taking into account caches and other temporary stores, then components are not allowed to affect the real state non-deterministically with respect to the effective order of instruction execution. If desired, a timer can be placed on an I/O bus.

Given that the I/O operations are ordered by the program, and the program is the same for all the processing sets, the monitor unit should see the same I/O operation presented by each processing set at the time any I/O operation is effected.

In order to keep the real state of the processing sets the same when they receive an interrupt, the interrupt is arranged to be taken by each processing set after the same instruction. If the processing sets are not doing an I/O operation, the monitor unit cannot guess at where the instruction counters of the processing sets point. The monitor unit 18 needs some way to deliver the interrupt in sync.

As described above, each processor in a processing set issues a special I/O operation in a predictable way (equivalent to every 100 instructions, for example), which allows the monitor unit 18 to observe how far the processing sets have progressed. By keeping the count of the special I/O operations, the monitor unit can deliver the same interrupt on the same instruction to the processors concerned.

If the special I/O cycle is a read which stalls the processor, the monitor unit can choose always to hold up the faster processor which does the I/O operation first, until the slower processor has caught up. This does not slow the system much, for, overall it cannot proceed faster in the long term than the slowest processing set being compared. This way, the special I/O operations would proceed in step. When an interrupt needs to be sent, the monitor unit arranges for this to be returned with the response to the progress indications. This is done in a very convenient manner by arranging that the progress registers 94 of FIG. 9 act as interrupt registers for holding an interrupt pending receipt of all of the special read cycles forming the progress indications from the equivalent processors of the processing sets. In this manner, when the response is sent on receipt of the last of the equivalent I/O read cycles from the equivalent processors of the processing sets, the I/O operation can be delivered in synchronism. At this time the program counter in the individual processors will be pointing to the instruction implied by the deterministic instruction progress count mechanism and the returned data from the special I/O read is taken by the processors as the interrupt information.

The common I/O bus interface 58 could be responsive to a received interrupt from the bus 20 to convert the interrupt signal to interrupt data for storage in respective progress registers 94.

It should be noted that when a processor carries out this special read cycle, the processor can progress instructions around the read cycle which do not depend on the read data. In general, any instruction which does not depend on the read data can be retired from the execution unit. However, this does not lead to a precise exception model. If the read data is replaced with an exception, the real state of the processing sets during exception processing is not predictable. This is not appropriate for the special progress indication I/O cycles of a lockstep system. It is necessary, for this particular type of instruction and bus cycle, that exceptions be precise around the special I/O cycle. If an interrupt is delivered, the instruction on which it is delivered must be predictable, and all instructions up to that one should have completed, and all beyond it should not have issued.

In modern processing sets, bus cycles to I/O devices are not necessarily simple. Bus cycles can be broken down into separate address and data phases, with the data phases disconnected from and not necessarily in the same order as the address phases. Multiple I/O operations (I/O cycles) can be in progress at one time, and I/O instructions may be retired from the execution unit before the first evidence of the I/O operation has appeared from the processor, let alone been completed.

To facilitate the determination of equivalent operations to be compared, the monitor can be configured to be operable:
  to determine a buffer for each I/O operation dependent upon first invariant information (e.g., an I/O operation type and/or a processor number within a processing set) in the I/O operation;
  to determine an order of I/O operations within the identified buffer dependent on second invariant information (e.g., an address phase ordering or an order number) in the I/O operations; and
  to determine equivalent operation of the processing sets on the basis of equivalent third invariant information (e.g., write value data, an I/O command and an address) in the I/O operations at equivalent positions in equivalent buffers for the processing sets.

As an extension of the arrangement shown in FIG. 10, multiple I/O buffers could be provided with instructions being allocated to the individual I/O buffers in accordance with invariant information in an I/O operation indicative of a processing set, an I/O operation type and, in the case where a processing set contains multiple processors, a processor number within the processing set. A particular location within the I/O buffer for storage of the I/O operation could be determined in accordance with invariant information representative of I/O ordering such as, for example, an address phase ordering or an order number. Accordingly., the I/O bus interfaces can be operable to store a newly received I/O operation at an appropriate location in an appropriate buffer in accordance with the first and second invariant information types mentioned above. The voter or voters (e.g. the read and write voters 118 and 116) in the I/O monitor 18 can then be operable to determine equivalent operation of the processing sets on the basis of equivalent third invariant information in the I/O operations at equivalent positions in equivalent buffers for the processing sets. The third invariant information can be write value data, an I/O command, or an address, and other invariant information representative of the meaning of the I/O operations. The monitor ignores variant information in an I/O cycle, such as the precise time of arrival of the cycle.

It should be noted that this is different from accesses by the processor to main memory which access the 'real state', of the processing set. This architecture places no restrictions on main memory access, which need not be in the same order on different processing sets in order to achieve lockstep operation.

There are several circumstances in which an I/O cycle might need to trigger a data access exception in the processor. These are
1) a programming error, such as a software access to a non-existent device, or an access to a real device in an inappropriate way;
2) a device failure, such as where device data is clearly corrupt, or the device does not respond at all.
3) an out-of-sync event, such as where the monitor unit has detected an out-of-sync condition, where the compared processing sets are not operating in lockstep. In order to trigger a diagnostic routine in the processing sets and to maintain a virtual machine model of processing set operation, the monitor unit can be arranged to return an access exception even though it could return real data if it actually did the I/O cycle, in the expectation that the I/O cycle will be rerun later after some recovery action.

For write cycles, none of these events need trigger an access exception in that:
1) in the case of a non-existent device the data can simply be discarded, and in the case of an access to a real device in an inappropriate manner an exception converter (58, to be described with reference to FIG. 11) can be arranged to indicate device failure due to a faulty access rather than due to a faulty device and label it as such;
2) with write data the device will typically not respond anyway; and
3) write instructions can be buffered in the monitor 18 and then be sent when the monitor 18 has decided which is correct.

For read cycles, for cases 1 and 2 above, it is not necessary to return an access exception in order to recover properly. As these are I/O cycles, they are generated by device drivers.

Through the use of conventional device driver hardening, the driver software hardens the driver against faults in data read from the device. A check routine in the driver can typically detect a fault, even if there is no other clue than the presence of corrupted data.

Figure 11:
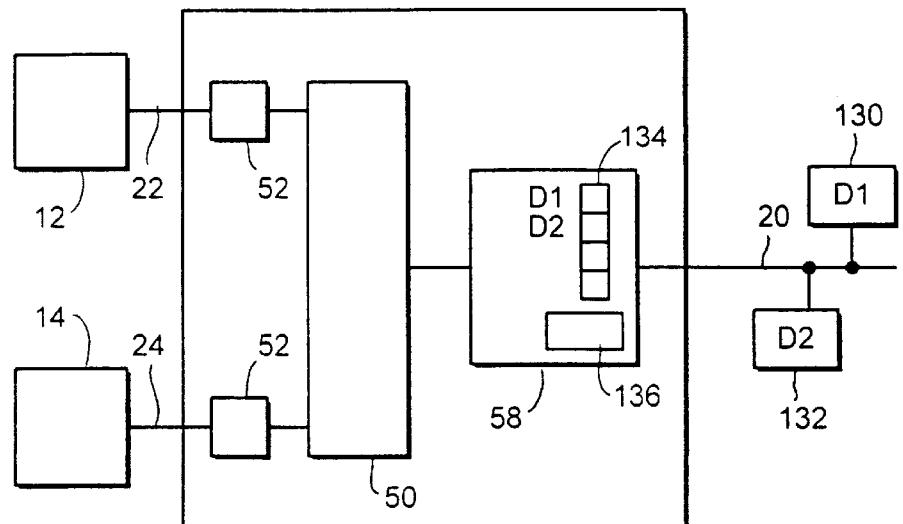
FIG. 11 is a schematic block diagram illustrating an aspect of the system of FIG. 1.

FIG. 11 is a schematic representation of an arrangement for handling general reporting and/or recovering from faulty I/O devices. FIG. 11 is directed to an example of a multi-processor system with two processing sets, although it is equally applicable to processing systems with more than two processing sets (e.g. as shown in the earlier figures) or even to a processor system with a single processing set and an monitor unit which passes I/O operations to and from the processor. A common feature here is an I/O bus interface such as the I/O bus interface 58 of FIG. 11 which controls the passage of I/O operations to the external (common) bus 20 and the receipt of I/O operations from the I/O devices such as I/O devices 130 and 132, and also bus exceptions. The I/O interface 58 is arranged to be responsive during an I/O read cycle from to a bus error signal from the bus (indicative for example of a faulty device) to substitute the bus error signal with a predetermined data value from a register 136, and to pass the predetermined data value to the processor or processors 12/14. The I/O interface 58 is arranged to be responsive to a bus error signal during an I/O write cycle to discard the write and to terminate the I/O cycle by returning an acknowledgement to the processor(s) and/or processing set(s), as appropriate. The I/O interface 58 is further operable during a read cycle or a write cycle to determine the source of the bus error and to label the device forming the source of the bus error as being faulty by setting a fault flag in a status register 134. On the first occasion a device, or resource, on the device bus is labelled as faulty, an interrupt am be returned to the processor(s) or processing set(s) as appropriate.

The I/O interface 58 is subsequently operable to respond to an I/O operation from at least one of the processing sets for a resource (device) 130 or 132 already labelled as defective by means of the flag in the status register 134 to prevent the I/O operation from being passed to the external bus 20. In the case of reads it is further operable to return a predetermined data response to the initiating processing set. In the case of writes, it is operable to discard the operation and to terminate by returning an acknowledgement to the initiating processing set. As will be noted in FIG. 11, in an arrangement where I/O operations from multiple processing sets pass via a voter/controller 50, the I/O interface which performs the bus error signal modification is provided between the voter 50 and the external common bus or buses 20.

It is thus possible for the monitor unit to bar access to devices that have once returned faulty data, so that the driver soon notices the problem. If the monitor unit returns unspecified data for the problematic I/O cycle, and does not signal an access exception, the processing sets will continue in sync, no matter what the complexity of the I/O cycle and instruction ordering rules. The monitor unit has to return the same faulty data to the two processing sets. The monitor unit may choose to signal the fault with an interrupt later.

For a read cycle in case 3 above, it is important that the access exception routine prevent the processor from acting on faulty data. On return from the exception, the processing set can re-run the I/O read cycle and proceed without the underlying device driver knowing anything of the diagnostic event triggered by the out-of-sync condition. When the access exception routine is in progress, it does not matter whether the 'real state' of the compared processing sets is the same. The processing sets are already out of sync. More divergence is immaterial. Only one of the processing sets is going to be deemed to be correct when a re-configuration is done to recover from the fault. Therefore, it does not matter exactly what instructions have been completed when the access exception occurs. Provided that some trace in the processor allows the processor to recover and re-run the I/O operation where it left off, the exception need not be precise.

For triple-modular-redundant (TMR) fault tolerant systems, it is advantageous if two processing sets can carry on in sync after an out-of-sync (OOS) event, instead of just one. For this to happen, the data access exception on an out-of-sync I/O read cycle would have to be precise. A less restrictive approach is to have the monitor unit recognise the easy diagnostic signature of the two-to-one vote of a TMR system and automatically re-configure the system on an out-of-sync event. The monitor unit will, on the OOS event, immediately start ignoring the output of the mis-comparing processing set, and carry on in a dual-modular-redundant (DMR) configuration with the remaining two processing sets. The I/O cycle in progress can be completed without any exception, and still the data access exception need not be entirely precise.

If I/O cycles are split into separate address and data phases, and the order of the cycles is defined by the address phases, it is not necessary that the data phases be in the same order on the compared processing sets. It may be convenient for the monitor unit that this is the case, but changes in the detailed bus timing are part and parcel of asynchronous lockstep operation, and reordering of the data phases is just a detail of the bus timing. All that is needed is that there exists at all times a deadlock-free mechanism for the monitor unit and the processors to make progress. Resources and protocols must exist so that enough pending I/O cycles become visible at the monitor 18 to perceive matched operations. An I/O cycle from one processor in a processing set may not block an I/O cycle from another.

One optimisation which the processor may employ is to merge multiple I/O accesses into a single bus cycle when convenient. For example, if two one-byte reads are pending to adjacent I/O addresses, the processor might issue them as a single two-byte read. This is a general problem for I/O drivers. If one processing set issued two single-byte cycles, while another issued one two byte cycle, the monitor unit has a harder job. This sort of rearrangement can cause I/O device mis-operation, even in an ordinary processing set. Therefore, processing sets do have mechanisms which ensure that this merging need not happen on I/O cycles. All that is needed for asynchronous lockstep operation is to ensure that these optimisations are suppressed for all I/O cycles.

Thus we see that asynchronous lockstep operation actually places remarkably few restrictions on I/O implementation.

In a preferred embodiment of the invention, the monitor unit 18 allows sophisticated processor operation around I/O cycles with the return of data instead of an access exception for some faulty I/O cycles.

Processors may perform instruction fetches and data reads and writes through memory management units (MMUs). The intent of the MMU is to provide a virtual address space which can be translated into a real address space. The implication is that if the translation does not succeed, and the virtual datum is not mapped onto the physical space, an exception can be taken in the processor to reconfigure the system without the underlying operation being disturbed.

Page miss exceptions are often somewhat de-coupled from the event which caused the page miss. For example, an instruction prefetch might cause the page miss handler to be triggered, rather than instruction execution. A write data page miss might be discovered long after the store instruction has been retired from the execution unit. On asynchronous systems, this lack of precision could cause compared processing sets to diverge. A solution to this is to have precise page miss exceptions for both data and instructions. The page miss exception handler should be entered precisely when the missing instruction is needed, or the missing data read or written. Instructions previous to this event should have completed, and instructions following this event should not have started.

The description of asynchronous lockstep operation so far divides processing sets into a core with a processor and a 'real state' of main memory, separated by the monitor unit from I/O devices. In the following, extensions will be described for processing sets having multiple processors.

For multi-processor (MP) operation, I/O operations are preferably labelled with their processor number. The monitor unit 18 is arranged to compare I/O operations processor-for-processor across compared processing sets. This can be achieved with multiple buffers in the monitor unit for I/O operations received from the processing sets, as described above. One processor P0 of a processing set 12 may produce the next I/O cycle first. Another processor P1 of the processing set 14 may produce a different I/O cycle first. This is not a fault. The monitor unit has hardware that sorts this out and waits for another processor to do an I/O cycle that matches up. If the system is working correctly, this will eventually happen. If the system is not working correctly, the monitor unit must trigger a reconfiguration in some way. However, this routine extension is not the real problem with MP asynchronous lockstep operation.

In MP machines, the processors act independently on the 'real state'. Processors in the separate compared processing sets do not progress at the same pace, and the relative progress of multiple processors in each independent processing set is not related. Imagine two compared processing sets, a and b. Each processing sets has an identical real state and two processors, P0 and P1. P0 and P1 both reside in the core with access to the real state without monitor unit interference. This is highly desirable for speed. If P0 and P1 in each processing set both need a new resource, say a page of memory, they will act to acquire the page from the pool of spare pages held in the real state. In a first processing set PUA, P0 is slightly faster and acquires the next page. In a second processing set PUB, P1 is slightly faster and acquires the next page. The real states of the processing sets have diverged, never to re-converge. In a single processor system, lockstep operation depends on the deterministic delivery of interrupts, which the monitor unit can arrange. In an MP system, lockstep operation also depends on the internal details of core operation, invisible to the monitor unit.

To overcome this, in an embodiment of the invention control is exercised over the way the multiple processors of a single processing set use mutual exclusion primitives (mutexes). In practice it is the various processing threads in the processors which use the mutexes. In an MP machine, to provide a reasonably simple programming environment, the processors (or rather the threads executing therein) use mutexes to manage access to areas of main memory. In fact, normally, the processors are not all working on the same part of the real state at all, but on orthogonal regions. The regions can have arbitrarily complex shapes—the addresses belonging to a region can be scattered everywhere—but regions do not overlap. When a processor (processor thread) needs access to an address in a region which may simultaneously be in use by another processor, it first acquires ownership of a mutex which the software provides specifically to prevent misunderstanding. Only one processor (processor thread) at a time gains write access to a region. While it has write access, no other processor (processor thread) has read access.

It is important to note that not all inter-processor interactions are strictly governed by mutexes in current programming. Other less dogmatic and even ad hoc mechanisms can be used. For example, one processor can be given implicit permission to write a location, with all processors permitted to read the location. Shared memory is available to user programs, and devious schemes can lie in applications unknown to the system. However, it is possible to transform all of these programs into programs that use mutexes.

Proper use of mutexes makes the processors of an MP system each act on its own portion of the total real state, with the important restriction that other processors will not modify that portion while the processor has access to it. So, if the partial real state visible to a processor is dependent only on that one processor's actions, then the processor's actions, which are dependent only on the visible part of the real state, will be determined by the initial value of the visible real state for that processor. Now that programming has ensured that the changes to the real state are determined by the initial value of the real state, the only variable left undetermined is the order of acquisition of the mutexes by the various processors. If the processors (processor threads) in the various processing sets acquire and release mutexes in the same order, then all the modifications to the real state are wholly determined. So the two restrictions for MP asynchronous lockstep operation are that the program properly uses mutexes to enforce individual processor access to parts of the real state that may be modified, and that the hardware arranges for the mutexes to be synchronized on the compared processing sets.

The monitor unit 18 can provide hardware intervention to enforce mutex ordering. Code for mutex acquisition and release can be changed to access the monitor unit. There are then many different methods for tie monitor unit to control ordering.

Figure 12:
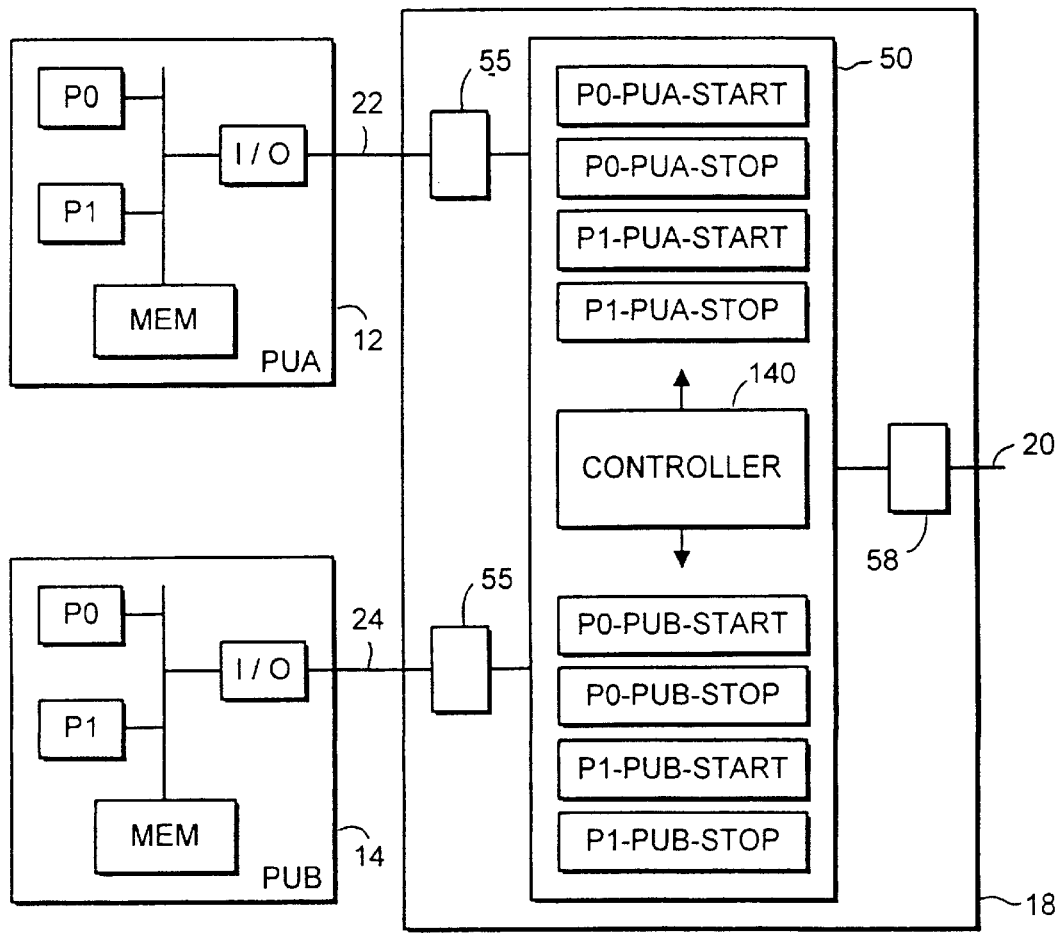
FIG. 12 is a schematic block diagram illustrating a further aspect the system of FIG. 1.

One approach for monitor unit control of mutex ordering is to have a per-processor mutex start and end register in the monitor unit for each processing set as represented in FIG. 12. So, in the above example, in processing set A, a processor P0 wishes to acquire the mutex controlling access to the free page list. It first reads the P0-PUA start monitor unit register (P0-PUA-start). The monitor unit 18 refrains from delivering the read result immediately, and code in the processor P0 ensures that mutex acquisition cannot proceed until the read result is returned. Later, a processor P1 in processing set PUB wishes to acquire the same mutex and reads the P1-PUB start monitor unit register (P1-PUB-start). The monitor unit 18 still refrains from delivering results. Now, because of the asynchronous determinism we are trying to create, we are guaranteed that P0-PUB and P1-PUA will soon try to acquire the same mutex. Say that the processor P0 in the processing set PUB is the next to reach this point. It will read the P0-PUB-start register. Now that the monitor unit 18 now has matching mutexes, P0-PUA and P0-PUB, it can allow progress. The monitor unit 18 returns read results for the I/O reads on the P0-PUA-start and P0-PUB-start registers, yet still holds on to P1-PUB-start register. The processor P0 on both processing sets proceeds to contend for the mutex using conventional operations on the real state. Either processor P0 will acquire the mutex or will not acquire the mutex. There are no other mutex operations going on, so we are guaranteed that the results will be the same on the processing sets PUA and PUB. After this, whether mutex acquisition was successful or not, the processor P0 on both processing sets PUA and PUB reads the P0-PUA stop monitor unit register (P0-PUA-stop) and the P0-PUB stop monitor unit register (P0-PUB-stop) respectively. This operation, which need not be held up by the monitor unit 18 whatever ordering happens, signals the monitor unit that mutex contention has ended. The monitor unit 18 is now free to allow the processor P1 to proceed with mutex contention. In fact, there are many optimisations which the monitor unit 18 can make to allow processors to make progress without stalling. However, in the end, speed of operation is determined by the slowest processor.

Another approach for the monitor unit to control mutex ordering is to provide multiple mutex start registers per processor. This small number of start registers can be mapped onto the large total number of mutexes by a hash translation mechanism in the mutex software executed by the processors. Which mutex the processor was contending for would determine which start register was accessed, but there need not be a one-to-one relationship. The monitor unit would then only hold up processors contending for mutexes on the same start register. This would reduce delays in the event that processors spent much time contending for mutexes. Note that only one stop register would be required per processor. Each processor only contends for one mutex at a time. If hash tables are used, the mutexes managed by independent entries in the hash table manage independent real state of the processor sets.

Another approach for the monitor unit to control mutex ordering is to have the monitor unit implement hardware mutexes. Read of a mutex register in the monitor unit can return a value to the processor, 0 or 1, depending on whether the acquisition was successful. A write to the same register by a processor could signal to the monitor unit that the mutex was released. However, care needs to be taken in this case because of the restrictions this places on the deterministic relationship between I/O reads and writes. Alternatively, a read of a different address could signal mutex release. Reads for mutex acquisition can delay returning data to ensure ordering. The monitor unit can provide multiple registers for each processor to implement many mutexes.

Figure 13:
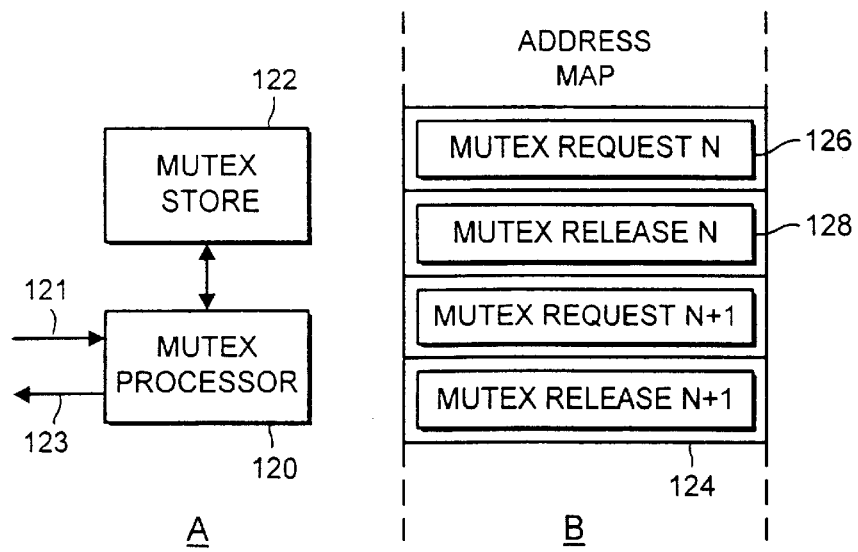
FIGS. 13A and 13B are a schematic block diagram illustrating mutex hardware and a representation of an associated address map, respectively.

FIG. 13A is a schematic representation of a possible configuration of mutex hardware, including a mutex processor 120 and a mutex store 122. FIG. 13B is an associated address map 124. Mutex hardware of this type can be useful to speed certain computations. The operation of the mutex hardware of FIG. 13 will now be described.

A processor P of a processing set (e.g., 12, 14) requests 121 ownership of a mutex N by issuing an I/O read request for the mutex request N register 126 address. The mutex processor 120 handles this request 121 and examines the mutex store 122 associated with mutex N. There need not be a one-to one relationship between mutex store hardware and the mutex registers. The mutex store 122 contains a value which indicates whether the mutex is currently owned or not owned. Either way, the mutex processor 120 ensures that, after this event, the mutex store 122 indicates that the mutex is owned. The mutex processor 120 returns to the processor a mutex response 123 which allows the requesting processor P to tell whether the original value of the mutex store was owned or not owned.

To relinquish ownership of the mutex N, the owning processor P reads the mutex release N register 128 address. The returned value is immaterial. The mutex processor changes the value in the mutex store for mutex N to indicate that it is not owned.

If a processor number is associated with the I/O cycles to the mutex hardware, the mutex processor 120 can detect the possible error of a request for one mutex from a processor P which already owns that mutex. Alternatively, this programming model can be defined to be correct, and the mutex processor 120 can store the 'number of times' a mutex is owned by one processor P in the mutex store, only releasing mutex ownership when this number has been decremented to zero by repeated mutex releases, or releasing it on the first mutex release, as the designer wishes. Similarly, the mutex processor 120 can detect the likely error of the release of a mutex which is not owned by the releasing processor P. Diagnostic information about these errors can be presented.

To use this mutex hardware in an asynchronous lockstep fault tolerant system, it can be placed on an I/O bus. The monitor unit 18 presents only voted and synchronized cycles on the I/O bus and so will automatically provide equivalent mutex ordering on multiple processing sets. No additional monitor capabilities are needed.

Yet another approach for the monitor unit to control mutex ordering is to use a combination of the above approaches. A relatively small number of high-use mutexes can be implemented in monitor unit hardware, as in the previous paragraph, and one or more start/stop registers per processor can provide control for an arbitrary number of less critical mutexes in main memory.

For simplicity of programming, the monitor unit can have all the processors for all the processing sets access the same address in the monitor unit mutex registers for the same mutex, and use hardware methods to distinguish between processing sets and processors for mutex ordering.

It should be noted that the mutex ordering scheme allows the monitor unit to return read success immediately the first processor on the first processing set reads a monitor unit mutex register. Other processing sets are guaranteed to catch up eventually, provided they are operating in sync. If they do not catch up, they are already out of sync, and extra divergence does no harm. However, as usual, such speed-enhancing optimisations are eventually limited by the need to wait for the slowest processing set in the end.

As mentioned above, a properly programmed MP system will limit processor access to a portion of the real state which will not be modified by another processor. If this is not the case, an asynchronous system cannot be made deterministic by mutex ordering. It may happen that software faults do not provide this constraint, and processors do access real state which is being modified. This can lead to a divergence in the real states of the compared processing sets, because of divergent ordering of accesses to the real state. These software faults are not uncommon in ordinary MP systems, and lead to difficult MP bugs. Programs assume they have write access to data when, in fact, they do not. An asynchronous lockstep method of configuring a system provides a way to find these faults relatively quickly.

In an ordinary MP machine, mutex programming faults lead to incorrect behaviour when the programs of two or more processors happen to conflict over accesses to data intended to be protected by the mutex. This may be a low probability event. It can go undetected for long after the real state of the processing set is modified, and the evidence can be obscured by the time the fault comes to light.

In an asynchronous lockstep machine, the same programming fault may cause the real states of compared processing sets to diverge. The congruence of compared real states is relatively easily checked (see below) and divergence can be detected relatively quickly, within a few instructions. The problem of detecting mutex programming errors has been transformed from a complex one which requires detailed knowledge of the purpose of each mutex to a mechanistic one which only requires comparison of real states. Examination of the recent behaviour of the processors after a real state divergence, perhaps with a logic analyser, will soon lead to the root cause of the error.

This transformation does not increase the probability of tripping over the access conflict, which still depends markedly on how often the programs visit the problem area of real state. However, a change in the way the processors work in each compared processing set can increase the chance that the programming fault will lead to a detectable real state divergence. Specifically, to look for mutex faults, a system could be arranged to ensure that the order of operation of the processors in compared processing sets is different in each processing set. For example, the processor P1 in the processing set PUA could artificially be slowed to half rate. The most extreme example of this occurs when in the processing set PUA, the processor P0 is allowed to complete all its instructions, then the processor P1 runs, while in the processing set PUB, the processor P1 completes, then the processor P0 runs. This could be achieved using the regular interrupt I/O cycle mechanism described above. The monitor unit could be arranged to enforce this specific ordering as an experiment to detect software locking faults. The processor P0 on the processing set PUA could be arranged to run, say, 10000 instructions while the processor P1 is stalled, and vice versa on the processing set PUB. Of course, if processors stall waiting for I/O in this time, the monitor unit must allow the appropriate processor on the compared processing sets to proceed, to avoid deadlocks.

Interrupt delivery needs only to be deterministic to each processor individually. It is not necessary to reach a common global state for each compared processing set before delivering an interrupt. Each processor can generate interrupt synchronization cycles and receive interrupts separately, and the mutex ordering mechanism will take care of everything else.

There may be hidden interactions between processors in ordinary MP processing sets which require transforming into regular mutex schemes for MP a synchronous lockstep machines to work. Some examples of these follow.

1) Two-flag communication.

Processor P1 writes flag F to 1 to indicate that data D is available. Processor P0 reads D into some private store, then writes F back to 0.

This is a perfectly valid two-processor communication system. It can be transformed into a mutexcontrolled system by having access to F managed by mutex MF. Then the operation would be:

| P1 | acquires MF |
| P1 | writes F to 1 |
| P1 | releases MF |
| P0 | acquires MF |
| P0 | reads F |
| P0 | reads D |
| P0 | writes F to 0 |
| P0 | releases MF |

2) Page Maps, MMU update.

Some processors automatically maintain page tables in hardware. The page tables exist in the real state of the machine. The MMU TLB in the processor can usually be considered a cache of the page table in memory, and thus not of much effect on the real state. However, if the TLB automatically writes used and modified page information to main memory page tables, this could be written differently among multiple processors on compared processing sets. Software mutexes will not help here. Programs have access to the page tables which may be modified by the hardware of various processors. The hardware knows nothing of the mutex schemes. One fix for this is to avoid hardware update of page tables. Page table modification can be done by software in page miss exception routines. The miss routines and other code which accesses page tables can use mutexes, and the monitor unit's mutex-ordering scheme will fix the determinism problems. In order for this to work, the page miss exceptions must be precise.

Base operating system update of page tables in memory, especially flushing of no-longer-valid entries, must be coordinated between processors to ensure deterministic operation. A hardware table walk of a page table to load an entry must be coordinated with another processor's modification of that entry. This is easy if page miss handling is done by software exception, not hardware table walk. The mutex ordering system handles the problem.

3) DMA

I/O devices often use direct memory access (DMA) to read or write the real state of the system efficiently. The incorporation of DMA an asynchronous lockstep machine will now be described.

One way to handle DMA is for the processor to write a command register in the I/O device, for the DMA to complete, and for the I/O device to provide a completion status register or interrupt. This sequence acts in the same way as a mutex to control access to the area of main memory used for I/O communications. Processors normally avoid reading or writing this communication area while the I/O device is transferring it. This can be accomplished through ordinary programming. In an asynchronous lockstep machine, the monitor unit 18 needs to provide no extra ordering other than that required for the previously-described comparison of I/O cycles (or interrupt delivery, if interrupts are used for completion signalling). Conventional ordering requirements from ordinary processing sets take care of all other problems. The monitor unit can transform the single DMA access from the I/O device into a memory cycle for each of the compared processing sets. For a write cycle, all the processing sets are written. For a read cycle, read data from all the processing sets can be compared.

Another DMA technique is for the command buffers managing DMA to be in main memory. When this is the case, programs need extra care to ensure that asynchronous determinism is maintained. If no extra care is taken, when DMA completion status is written to main memory, processing set PUA could sample the completion status before it is updated, and processing set PUB could sample it after it is updated.

Figure 14:
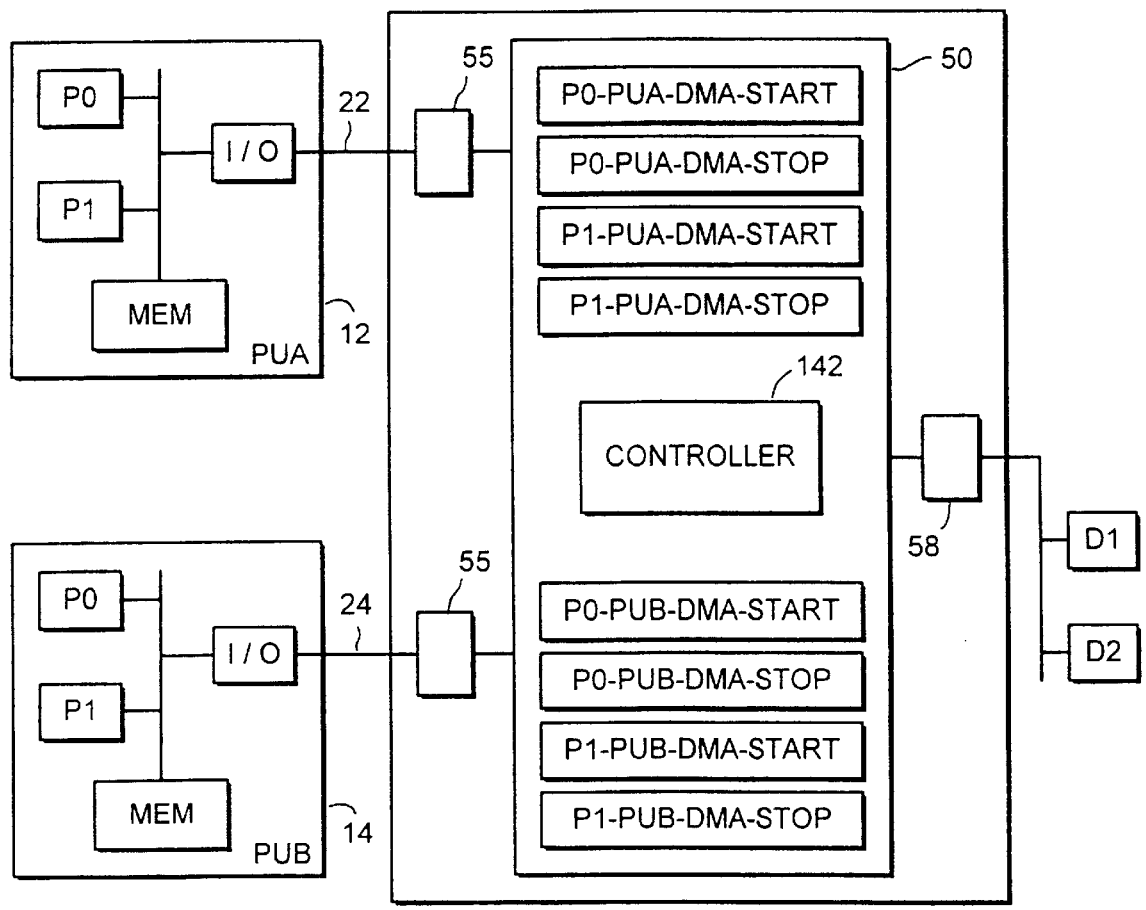
FIG. 14 is a schematic block diagram illustrating another aspect of the system of FIG. 1.

One way of providing protection against processor-DMA interaction when command and status buffers are in main memory is to provide per-processor per-processing set DMA sampling registers in the monitor unit, as represented in FIG. 14. When processors are going to read or write a location to which an I/O device is going to have simultaneous access, they first read the P0-PUA-DMA-start register. A controller 142 in the monitor unit waits for all the processing sets to reach this point, then ensures that the same DMA has been completed to all the processing sets. It inhibits DMA and allows the processing sets to proceed by providing a result for the read cycle. The processor modifies or reads the DMA command data, then reads the P0-PUA-DMA-stop monitor unit register. The monitor unit allows the processing sets and DMA to proceed freely again. Because the monitor unit is directly in the DMA path and can see and control every DMA access it can effectively impose the same ordered mutex mechanism used for multiprocessor determinism.

In the above example, it is possible to provide multiple DMA start and stop registers, where each register controls DMA access for a separate I/O device. It is not necessary to inhibit DMA for all devices when a processor is accessing the DMA control block in main memory for only one device. The monitor unit is arranged to know from which device each DMA cycle comes.

There now follows an description of the provision of signatures and analysers.

Asynchronous processing sets can look completely different in detail while executing exactly the same change to their identical real states.

Figure 15:
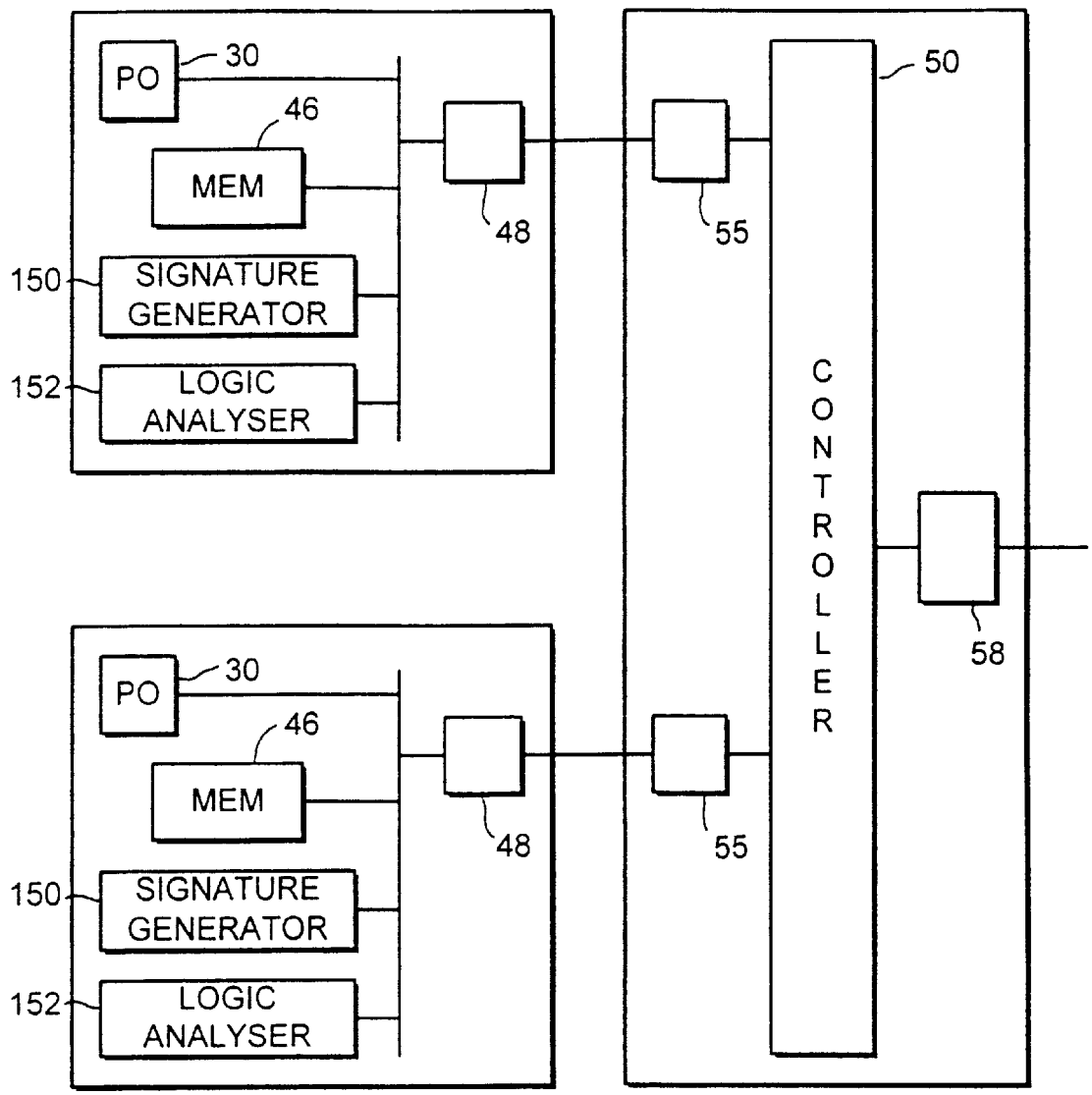
FIG. 15 is a schematic block diagram illustrating a further aspect of the system of FIG. 1.

For example, a variable held in a cache in one processing set can be relegated to main memory in another. Main memory update cycles can execute in different orders. Memory writes on one processing set can be merged into a single cycle, while they can have multiple cycles on another. Even though I/O cycles in an asynchronous lockstep system can be easily compared, speed optimisations may make comparison of changes to the real state of the processing sets less easy. It is possible to build proper fault tolerant machines which take no notice of the real state. However, to diagnose faults quickly, both hardware and mutex software, it is desirable to detect divergence in real state quickly. This can be done by adding signature features to the processors, including a signature generator 150 and logic analyser 152, as represented in FIG. 15.

Changes to the real state are made by the processors. If the real state is considered to include the register values inside the processor, every instruction which writes to a register updates the real state. A mechanism can be provided for comparing in detail the operation of synchronous systems through a limited bandwidth channel. The same signature mechanism can be used to compare all the processor register write data and instructions in an asynchronous deterministic system.

The processors have extra hardware added to them to create signatures of their internal operation. The signature is affected in some complex way by the data written by the processor, the register written to, and the order of the instructions. The signature is updated as each instruction is retired, in the effective order intended by the programmer, no matter what the order of execution by the processor is. It is possible to do this in a determined way even if the processor is fully asynchronous. From time to time, the monitor unit compares the signatures between processors on different compared processing sets. A convenient way to do this is to have the processors write their current signature from their respective signature generators 150 to the monitor unit just before they do their predictable interrupt-update cycles, described above. If the monitor unit detects equivalent processors have different signatures, it can cause corrective action to be taken.

There are different levels of comparison possible for signature generation.

Level one comparison can build signatures just from the write cycles to main memory, for example the SPARC 'st' operation. The address and data of each write cycle can update the processor signature. This will detect changes in the real state apart from register contents. A divergent value could lurk for a long time inside the processor without becoming visible. When it did become visible, it might be hard to find the reason for divergence. A logic analyser would need arbitrarily deep storage to find this. It should be noted that cycle merging (i.e. the tendency of load/store units to merge two adjacent small store operations into one large store operation) should be disabled.

Level two comparison builds signatures from all the main memory writes and also all the register writes too. This requires more hardware but guarantees that divergence is detected quickly, within a finite analyser storage requirement.

Level three comparison builds signatures from memory writes, register writes and memory reads. It is possible in a faulty system for all the writes from each processor to produce the same signature yet for the real state to be different, because writes from one processor overwrite those from another, and processor ordering differs between processing sets. While this, when eventually observed by changing write data signatures, can be detected by methods one and two, a neater detection method can use the data read as the real state as well. Register read data cannot be divergent in this way because registers are only writable by the local processor.

In combination with signature comparison, a small logic analyser built into the processors can provide excellent debug capability for mutex programming faults. The storage requirement for the logic analyser 152 is only enough to stretch from one signature comparison to the next. An analyser built into the processor can have a complete view of the instructions being executed, the data read from main memory, the data written to registers and the data written to main memory. Communication at runtime between the analysers in different processing sets and processors is not needed.

On a signature difference, the logic analysers in all the processors can be triggered. An interrupt can cause the processing sets to dump their (divergent) states to disk. The logic analyser data from each processor can also be dumped. The system can mail off the dump data for human analysis. The processing set can continue running, if possible.

There has, therefore, been described a multiprocessor computer system employing asynchronous processing sets which is suitable for forming a fault tolerant multiprocessor computer system. An embodiment of the invention is applicable to any system where one or more of a plurality of processing sets or processors is or are operating asynchronously of one or more of the other of the processing sets or processors.

Various embodiments of the invention can provide particular and preferred features, including one or more of the following:

a lockstep system using non-synchronized processing sets;

deterministic operation of asynchronous processors;

deterministic interrupt delivery in an unsynchronized system;

asynchronous comparison and synchronization by means of a monitor unit;

mutex ordering for asynchronous determinism;

a monitor unit for mutex ordering;

asynchronous lockstep for mutex fault discovery;

DMA mechanism with asynchronous determinism.

With an embodiment of the invention, lockstep fault tolerant systems can be built with different mask versions of the processors. One can also build lockstep fault tolerant systems with much more ordinary hardware that for conventional synchronized systems as there is no need for critical phase lock control of clocks. Lockstep fault tolerance can be effected with much reduced hardware redesign than is the case with synchronous approaches. Although asynchronous processors may use twice the transistors for the same design, they may run at one tenth the power consumption of synchronous systems. As the available transistor count increases for processor designers, asynchronous design may become commonplace for processors and an embodiment of the invention will enable the generation of lockstep systems using such processors. Careful design of the monitor unit allows I/O data access exceptions that are not totally precise, just restartable. This gives design freedom in the processor for bus operations.

There has been described an I/O monitor for a computer system, the monitor comprising interface means for connection between a processor and an I/O bus and error signal modifier means for responding to an error signal from the I/O bus to substitute a determined response for passing to the processor. The I/O monitor can also include means for labelling a fault status of a resource connected to the I/O bus and error signal means for responding to an I/O operation from a processor addressed to a resource labelled as defective to provide a determined response to the processor.

It will be appreciated that although particular embodiments of the invention have been described, many modifications/additions and/or substitutions may be made within the spirit and scope of the present invention as defined in the appended claims.

What is claimed is:

1. An I/O monitor for a computer system, the monitor comprising an I/O interface connectable between at least one processor and an I/O bus to control the passage of I/O operations to the I/O bus and the receipt of I/O operations and bus exceptions from the I/O bus, wherein the I/O interface is operable:
   during an I/O read cycle, to respond to a bus error signal from the bus by substituting a predetermined data value for the bus error signal and passing the predetermined data value to said at least one processor, to determine a resource that forms the source of the bus error and to label the resource forming the source of the bus error as being defective; and
   during an I/O write cycle, to respond to a bus error signal by discarding the write and terminating the I/O cycle by returning an acknowledgement to said at least one processor, to determine a resource that forms the source of the bus error and to label the resource forming the source of the bus error as being defective.

2. The monitor of claim 1, wherein the I/O interface comprises status flags settable to indicate the fault status of resources connected to the bus.

3. The monitor of claim 2, wherein the I/O interface comprises a status register for each said resource, the status register including at least one bit for indicating the fault status of the resource.

4. The monitor of claim 2, wherein the I/O interface is operable to return an interrupt to said at least one processor when a resource is first labelled as defective.

5. The monitor of claim 2, operable to respond to an I/O read operation from a processor addressed to a resource labelled as defective to prevent the I/O read operation from being passed to the bus and to return a determined data response to the processor.

6. The monitor of claim 2, operable to respond to an I/O write operation from a processor addressed to a resource labelled as defective to discard the I/O write operation and to terminate with an acknowledgement to the processor.

7. A computer system comprising:
   at least one processing set including at least one processor;
   a monitor comprising an I/O interface connectable between said at least one processor and an I/O bus to control the passage of I/O operations to the I/O bus and the receipt of I/O operations and bus exceptions from the I/O bus, wherein the I/O interface is operable:
      during an I/O read cycle, to respond to a bus error signal from the bus by substituting a predetermined data value for the bus error signal and passing the predetermined data value to said at least one processor, to determine a resource that forms the source of the bus error and to label the resource forming the source of the bus error as being defective; and
      during an I/O write cycle, to respond to a bus error signal by discarding the write and terminating the I/O cycle by returning an acknowledgement to said at least one processor, to determine a resource that forms the source of the bus error and to label the resource forming the source of the bus error as being defective.

8. The system of claim 7, wherein the I/O interface comprises status flags settable to indicate the fault status of resources connected to the bus.

9. The system of claim 8, wherein the I/O interface comprises a status register for each said resource, the status register including at least one bit for indicating the fault status of the resource.

10. The system of claim 8, wherein the I/O interface is operable to return an interrupt to said at least one processor when a resource is first labelled as defective.

11. The system of claim 8, wherein the monitor is responsive to an I/O read operation from a processing set addressed to a resource labelled as defective to prevent the I/O read operation from being passed to the bus and to return a determined data response to the processing set.

12. The system of claim 8, wherein the monitor is responsive to an I/O write operation from a processing set addressed to a resource labelled as defective to discard the I/O write operation and to terminate with an acknowledgement to the processing set.

13. The system of claim 8, wherein the resource is an I/O device.

14. The system of claim 7, comprising a plurality of processing sets.

15. The system of claim 14, wherein at least one of the plurality of processing sets is operable asynchronously of a second processing set.

16. The system of claim 14, wherein the system is a fault tolerant computer system and the monitor comprises a voter that is operable to comparing I/O operations from the processing sets and to pass I/O operations only when predetermined voting rules are met, the voter being located between the plurality of processing sets and the error signal modifier.

17. The system of claim 7, wherein the at least one processing set is a symmetrical multiprocessor.

18. A computer system comprising at least one processing set, an I/O bus and an I/O monitor, the I/O monitor comprising an I/O interface connectable between at least one processor and an I/O bus to control the passage of I/O operations to the I/O bus and the receipt of I/O operations and bus exceptions from the I/O bus, wherein the I/O interface is operable:
   during an I/O read cycle, to respond to a bus error signal from the bus by substituting a predetermined data value for the bus error signal and passing the predetermined data value to said at least one processor, to determine a resource that forms the source of the bus error and to label the resource forming the source of the bus error as being defective;

during an I/O write cycle, to respond to a bus error signal by discarding the write and terminating the I/O cycle by returning an acknowledgement to said at least one processor, to determine a resource that forms the source of the bus error and to label the resource forming the source of the bus error as being defective; and to respond to an I/O operation from a processor addressed to a resource labelled as defective to provide a determined response to the processor.

19. The system of claim 18, wherein the I/O monitor is operable to prevent an I/O read operation addressed to a resource labelled as defective from being passed to the bus and to return a determined data response as the determined response.

20. The system of claim 18, wherein the I/O monitor is operable to discard an I/O write operation addressed to a resource labelled as defective and to terminate with an acknowledgement as the determined response.

21. A method of reporting bus errors in a computer system comprising at least one processor, an I/O bus and an I/O monitor, the method comprising the monitor:

during an I/O read cycle, responding to a bus error signal from the bus by substituting a predetermined data value for the bus error signal and passing the predetermined data value to said at least one processor, determining a resource that forms the source of the bus error and labelling the resource forming the source of the bus error as being defective; and during an I/O write cycle, responding to a bus error signal by discarding the write, terminating the I/O cycle by returning an acknowledgement to said at least one processor, determining a resource that forms the source of the bus error and labelling the resource forming the source of the bus error as being defective.

22. The method of claim 21, comprising the I/O interface setting status flags to indicate the fault status of resources connected to the bus.

23. The method of claim 22, comprising the monitor maintaining a status register for resources, each status register including at least one fault status bit.

24. The method of claim 22, comprising the monitor generating an interrupt when a resource is first labelled as defective.

25. The method of claim 22, comprising the monitor responding to an I/O read operation from at least one processing set addressed to a resource labelled as defective by preventing the I/O read operation from being passed to the bus and returning a determined data response.

26. The method of claim 22, comprising the monitor responding to an I/O write operation from at least one processing set addressed to a resource labelled as defective by discarding the I/O write operation and terminating with an acknowledgement as the determined response.

27. The method of claim 22, wherein the computer system comprises a plurality of processing sets and a voter, the voter comparing I/O operations from the processing sets and passing I/O operations to the I/O bus only when predetermined voting rules are met, wherein the step of converting the error signal into a determined data response is performed before passing the determined response to the processing sets via the voter.

28. A method for handling I/O operations in a computer system comprising at least one processor, an I/O bus and an I/O monitor located between the at least one processor and the I/O bus, the method comprising the I/O monitor:

during an I/O read cycle, responding to a bus error signal from the bus by substituting a predetermined data value for the bus error signal and passing the predetermined data value to said at least one processor, determining a resource that forms the source of the bus error and labelling the resource forming the source of the bus error as being defective;

during an I/O write cycle, responding to a bus error signal by discarding the write, terminating the I/O cycle by returning an acknowledgement to said at least one processor, determining a resource that forms the source of the bus error and labelling the resource forming the source of the bus error as being defective; and responding to an I/O operation from the processor addressed to a resource labelled as defective by providing a determined response to the processor.

29. The method of claim 28, comprising, for an I/O read operation addressed to a resource labelled as defective:

preventing the I/O read operation from being passed to the bus; and returning a determined data response as the determined response.

30. The method of claim 29, comprising, for an I/O write operation addressed to a resource labelled as defective:

discarding the I/O write operation; and terminating with an acknowledgement as the determined response.

* * * * *